Sept. 19, 1961     F. L. HOPKINS ET AL     3,000,454

MATERIAL WEIGHING AND BAG FILLING MACHINE

Filed Feb. 14, 1957     6 Sheets-Sheet 1

Fig. 1

INVENTORS
FRANK L. HOPKINS
JACK D. HELM
BY
*Merchant & Merchant*
ATTORNEYS

# United States Patent Office 3,000,454
Patented Sept. 19, 1961

3,000,454
MATERIAL WEIGHING AND BAG FILLING MACHINE
Frank L. Hopkins and Jack D. Helm, Minneapolis, Minn., assignors to Bemis Bro. Bag Co., St. Louis, Mo., a corporation of Missouri
Filed Feb. 14, 1957, Ser. No. 640,176
12 Claims. (Cl. 177—81)

Our invention relates generally to machines for weighing and dispensing bulk material, and more particularly to improvements in such machines whereby fast, efficient and accurate weighing of granular or powdered bulk material, is obtained.

An important object of our invention is the provision of a machine of the type disclosed, having weighing mechanism including a material receiving and dispensing bucket, a hopper positioned to feed material to said bucket and adapted to accumulate material fed thereto at a uniform rate, while the weighing bucket is being emptied, and to rapidly dump the accumulated material into the bucket after emptying thereof, whereby to prevent packing and bridging of the material in the hopper to effect an appreciable savings in time between weighing operations.

Another object of our invention is the provision of a novel arrangement whereby, after said dumping of the material from the hopper into the weighing bucket, the feeding means for said accumulator hopper feeds an additional quantity of material to the weighing bucket to provide a charge of material of predetermined weight in said bucket.

Another object of our invention is the provision of a machine as set forth including a hopper for accumulation of material to be weighed and means for feeding material to said hopper at a predetermined relatively low rate, said hopper having a gate for discharge of material into a weighing bucket at a relatively rapid rate, in which the feeding means causes material to be fed at said slow rate to the weighing bucket through the open accumulator hopper whereby a relatively simple and compact arrangement for fast and slow feed of material to the weighing bucket is obtained.

Another object of our invention is the provision of novel control means whereby operation of the accumulator hopper feeding means, opening of the hopper discharge gate to dump material into the weighing bucket, closing of the hopper discharge gate when the material from the bucket is brought to the desired predetermined weight, discharge of material from the weighing bucket, and readying of the weighing bucket to receive a succeeding charge of material, is entirely automatic.

Another object of our invention is the provision of a machine of the type herein described having a weighing bucket and an accumulator hopper as set forth, in which means is included whereby, when a predetermined quantity of material, less than the total quantity to be dispensed, accumulates in said accumulator hopper, further feeding of said material to the hopper is terminated until the material is discharged to the weighing bucket.

Another object of our invention is the provision of novel control means having control elements which prevent opening of the hopper discharge gate and dumping of material from the accumulator hopper until said weighing bucket is in readiness to receive said material.

Still another object of our invention is the provision of a machine as set forth having mechanism for releasably holding a container positioned to receive material from the weighing bucket, control means for causing automatic release of the container when material is discharged thereinto from the bucket, and novel means for selectively rendering said control means inoperative to cause release of said container, whereby a plurality of weighed charges of material may be dispensed thereto.

Another object of our invention is the provision of means whereby a generally vertically disposed weighing bucket is supported at a point in laterally off-set relation to the vertical axis thereof to provide a maximum opening at the central portion of its upper end for reception of material dumped thereinto from the accumulator hopper, and of novel means for holding said weighing bucket in its vertically disposed position against the tendency thereof to incline therefrom.

Another object of our invention is the provision of mechanism for feeding material to the accumulator hopper at a predetermined relatively slow rate of feed, and of novel means for adjusting said rate of feed material to the hopper. To this end we provide an endless feed belt having a delivery flight, and a barrier element overlying said delivery flight, said barrier element having an edge portion movable toward and away from the delivery flight and operative to regulate the thickness of the layer of material carried by said delivery flight to the accumulator hopper.

Another object of our invention is the provision of novel material discharge gate means at the bottom portion of said weighing bucket, and novel means for delaying closing of said gate means until the entire contents of the weighing bucket have been discharged therefrom.

Another object of our invention is the provision of a machine as set forth which may be selectively operated continuously as a fully automatic device, or in a semi-automatic manner at given time intervals as desired.

Another object of our invention is the provision of a machine for weighing and dispensing bulk material, which is relatively simple and inexpensive to produce, which is highly efficient in operation, and which is rugged in construction and durable in use.

The above and still further highly important objects and advantages will become apparent from the following detailed specification, appended claims and attached drawings.

Referring to the drawings, which illustrate the invention, and in which like reference characters indicate like parts throughout the several views.

Figure 1:
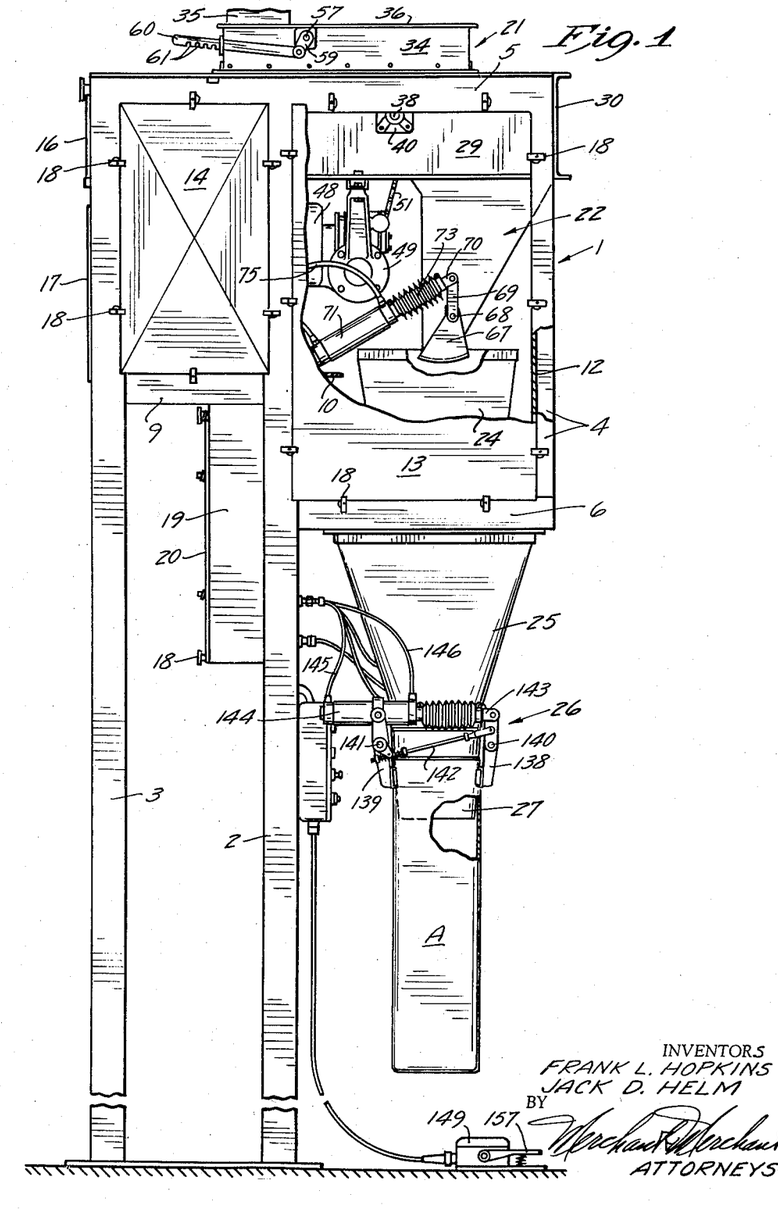
FIG. 1 is a view in side elevation of a weighing and dispensing machine constructed in accordance with our invention, some parts being broken away.
Figure 3:
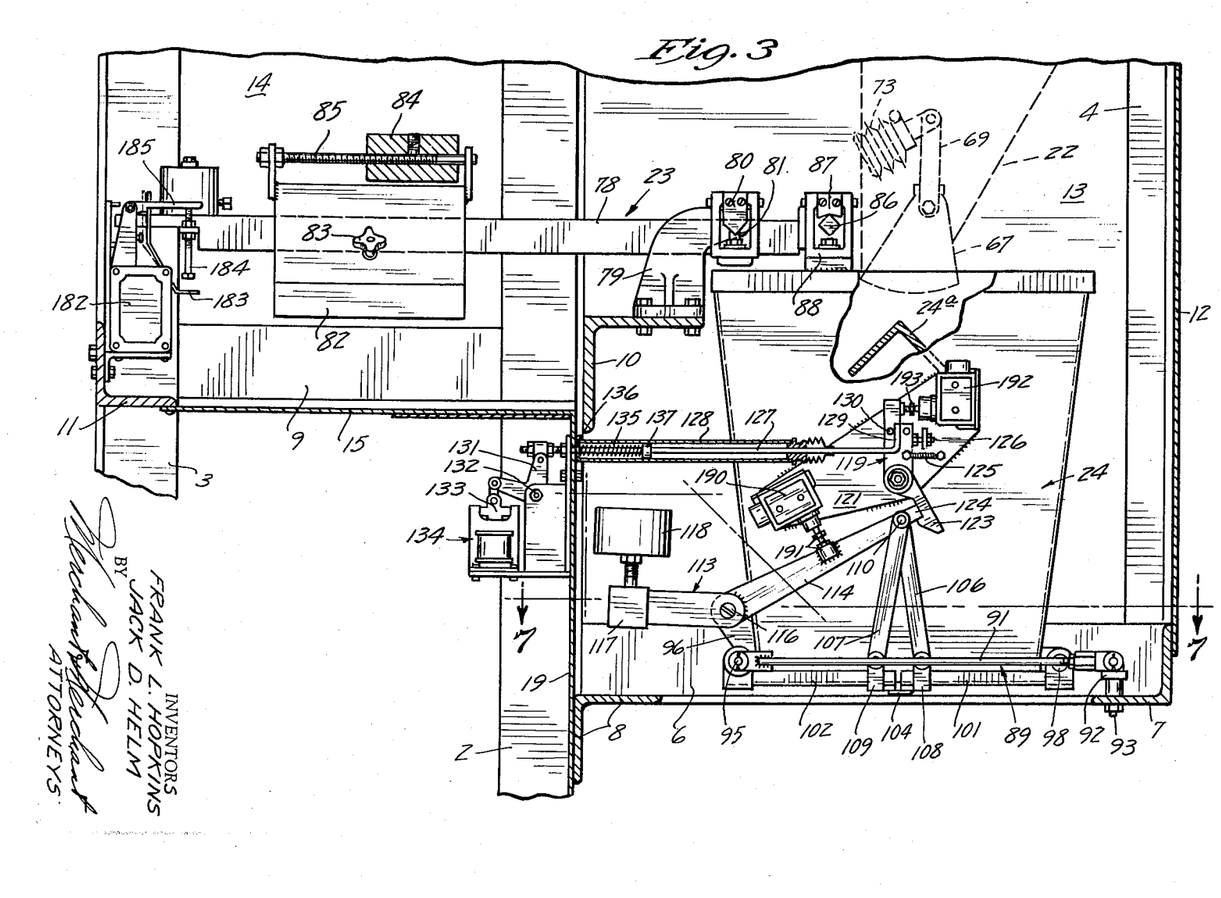
FIG. 3 is an enlarged fragmentary view corresponding to the intermediate portion of FIG. 1, some parts being broken away and some parts shown in section.
Figure 4:
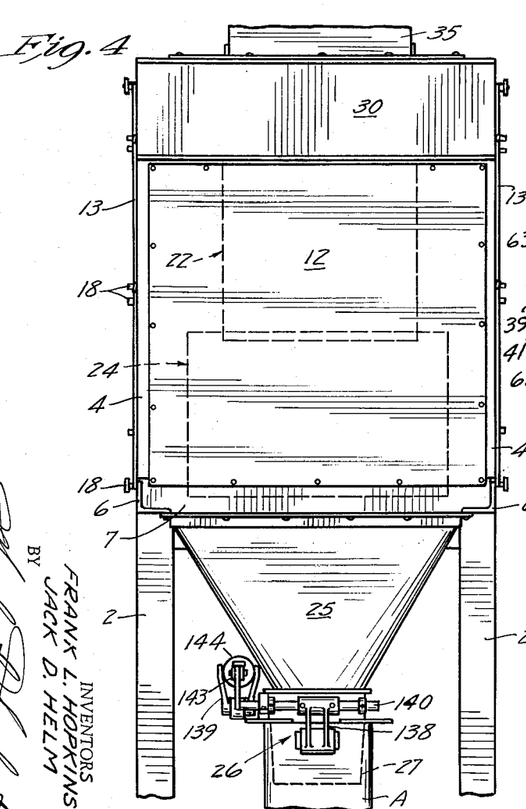
FIG. 4 is a fragmentary view in front elevation as seen from the right to the left with respect to FIG. 1.

Referring with greater detail to the drawings, the numeral 1 indicates in its entirety a generally rectangular frame structure including laterally spaced front and rear legs 2 and 3 respectively, vertically disposed front frame members 4 and upper and lower transverse members 6 being welded or otherwise rigidly secured at their front ends to the upper and lower ends of the front vertical members 4. The top members 5, one of which is shown, are connected intermediate their ends to the upper ends of the front legs 2, and at their rear ends to the upper ends of the rear legs 3. The front ends of the transverse members 6 are rigidly secured to opposite ends of a cross frame member 7, and the rear ends thereof are secured to a cross member 8 the opposite ends of which are welded or otherwise rigidly secured to the front legs 2. With reference particularly to FIGS. 1 and 3, it will be seen that the legs 2 and 3 are connected intermediate their ends by transverse members 9, the front legs 2 further being connected by a cross member or bar 10 in upwardly spaced relation to the cross member 8. It will be noted that the cross member 10 is substantially at the level of the transverse frame members 9, and that the rear legs 3 are welded or otherwise rigidly secured to opposite ends of a transverse member 11 adjacent the rear ends of the members 9. The upper end portion of the frame 1 is further provided with a front cover plate 12, side cover plates 13 and 14 and a bottom plate 15 which underlies the transverse members 9 and the cross member 11. Further, the rear side of the machine is provided with upper and lower cover plates 16 and 17 respectively, said cover plates being removably secured to the frame structure, by means of suitable latches or the like 18, the cover plate 16 being hingedly mounted. Below the bottom plate 15, a generally rectangular housing 19 having a cover plate 20 attached thereto, is mounted between the front and rear legs 2 and 3 for the reception of control elements hereinafter to be described.

The machine of the instant invention involves a plurality of cooperating units by means of which granular or powdered material is received from a source of supply and delivered to bags or other suitable containers in accurately weighed quantities for transportation to the user. The above-mentioned units include a feeding device indicated generally at 21, an accumulator hopper 22 for reception of material fed by the feeding device 21, weighing scale mechanism 23 including a weighing bucket 24 adapted to receive material from the accumulator hopper 22, a delivery chute 25, and bag holding mechanism 26 adapted to releasably support a bag A in material receiving position on the lower delivery end portion 27 of the delivery chute 25.

Figure 2:
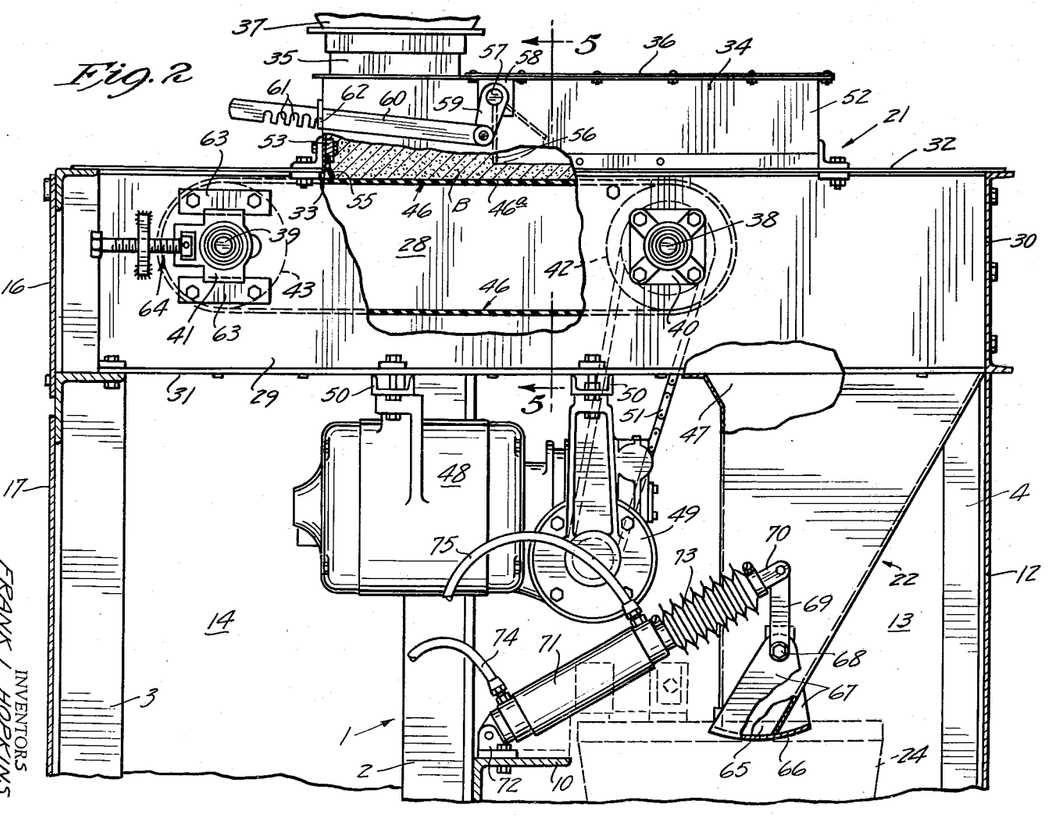
FIG. 2 is an enlarged fragmentary view corresponding to the upper end portion of the machine of FIG. 1, some parts being broken away and some parts being shown in section.

The feeding device 21 is contained within a housing comprising opposed side walls made from structural channel members 28 and 29, a front wall 30 also made from structural channel iron, a bottom wall 31 and a top wall 32. The top wall 32 defines an opening 33 that is covered by a generally rectangular hood 34 having a material receiving inlet 35 in the top wall 36 thereof. The inlet 35 is adapted to receive material from a suitable source of supply of granular or powdered material by suitable means such as a conduit, indicated fragmentarily at 37. A pair of transverse shafts 38 and 39 are journalled at their opposite ends in respective bearings 40 and 41 mounted in the side channel members 28 and 29. Preferably, the side members 28 and 29 are laterally inwardly spaced from the adjacent side cover plates 13 and 14, the channel member 30 extending across the upper end portions of the vertically disposed front frame members 4 and 5. Mounted on the shafts 38 and 39 are pulleys 42 and 43 respectively each thereof comprising generally circular end plates 44 and a center plate 44a and circumferentially spaced axially extending rods 45 rigidly secured at their opposite ends to the end plates 44 and at their intermediate portions to the center plate 44a. An endless feeding belt 46 is entrained over the pulleys 42 and 43 and is adapted to be moved thereby in a direction to feed material from the inlet 35 toward the accumulator hopper 22 which underlies the front end portion of the bottom wall 31 and which is bolted or otherwise rigidly secured thereto. With reference to FIG. 2, it will be seen that the accumulator hopper 22 is positioned to receive material, indicated at B, as the same is delivered over the pulley 42 by the feeding belt 46.

Figure 5:
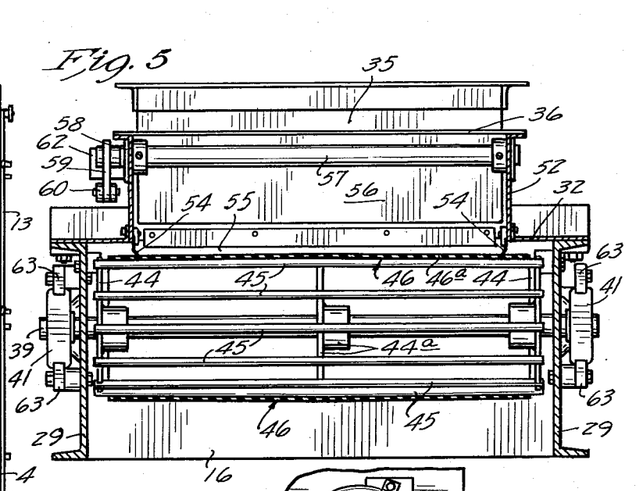
FIG. 5 is a fragmentary vertical section taken substantially on the line 5—5 of FIG. 2, some parts being removed.

Means for driving the feeding belt 46 in a direction to deliver material B to the open upper end 47 of the accumulating hopper 22, comprises a conventional electrical motor 48 having a conventional built-in speed reducer 49 and bolted or otherwise rigidly secured to a pair of mounting bars 50 anchored at their opposite ends to the channel members 28 and 29. The speed reducer 49 may be assumed to be provided with an axial shaft, not shown, having mounted thereon a sprocket wheel, also not shown. An endless link chain 51 is entrained over the reducer-equipped sprocket wheel and a second sprocket, not shown, but which may be assumed to be rigidly secured to one end of the shaft 38. Such drive means is common for numerous rotary elements and it is believed not necessary that the same be shown in detail. It should suffice to note that the motor 48 drives the feeding belt 46 at a relatively low uniform rate of speed to feed the material B to the accumulator hopper 22. As the pulleys 42 and 43 are caused to rotate, a vibratory movement is imparted to the feeding belt 46 by engagement with the axially extended rods 45 comprising pulleys 42 and 43. This vibratory movement tends to dislodge any particles of material which might adhere to the feeding belt 46 on the return flight thereof. With reference to FIGS. 2 and 5, it will be seen that the side and rear walls 52 and 53 respectively are provided with depending resilient skirts or flanges 54 and 55 respectively which prevent leakage of the material B laterally outwardly and between the engaged portions of the feeding belt 46. As material dislodged from the feeding belt 46 due to said vibration, falls to the bottom wall 31 and accumulates therefrom, the same may be removed therefrom for periodic cleaning or sweeping of the top surface of the bottom wall 31, access being had thereto through the open rear end of the frame structure normally closed by the hinged rear cover plate 16.

For the purpose of regulating the rate of feed of material B carried by the feeding belt 46, we provide an elongated generally rectangular barrier element 56 that is mounted on a regulator shaft 57 extending transversely across the hood 34 and which is journalled in suitable bearings 58 adjacent the side wall 52 of the hood 34. At one extended end, the shaft 57 is rigidly secured to the inner end of a crank arm 59 to the outer end of which is pivotally secured a control bar 60 having a plurality of longitudinally spaced downwardly opening notches 61 in its lower edge. The notches are adapted to selectively receive a locking tongue 62 rigidly secured to the rear wall 53 of the hood 34 whereby the control rod 60 may be adjusted to the desired degree. As shown in FIG. 2, longitudinal movement of the control bar 60 imparts swinging movement to the barrier element 56 the free edge of which moves closer or further away from the underlying portion of the hopper or delivery flight 46a of the feeding belt 46, whereby to adjust the thickness of the layer of material B on the delivery flight 46a. It will here be noted that the bearings 41 are mounted in guide bars 63 for movement toward and away from the bearings 40 and that adjustment screw devices 64 are provided to effect such movement whereby to keep the feeding belt 46 under the desired tension and to maintain proper trackings of the belt 46 over the pulleys 42 and 43.

Figures 9, 10:
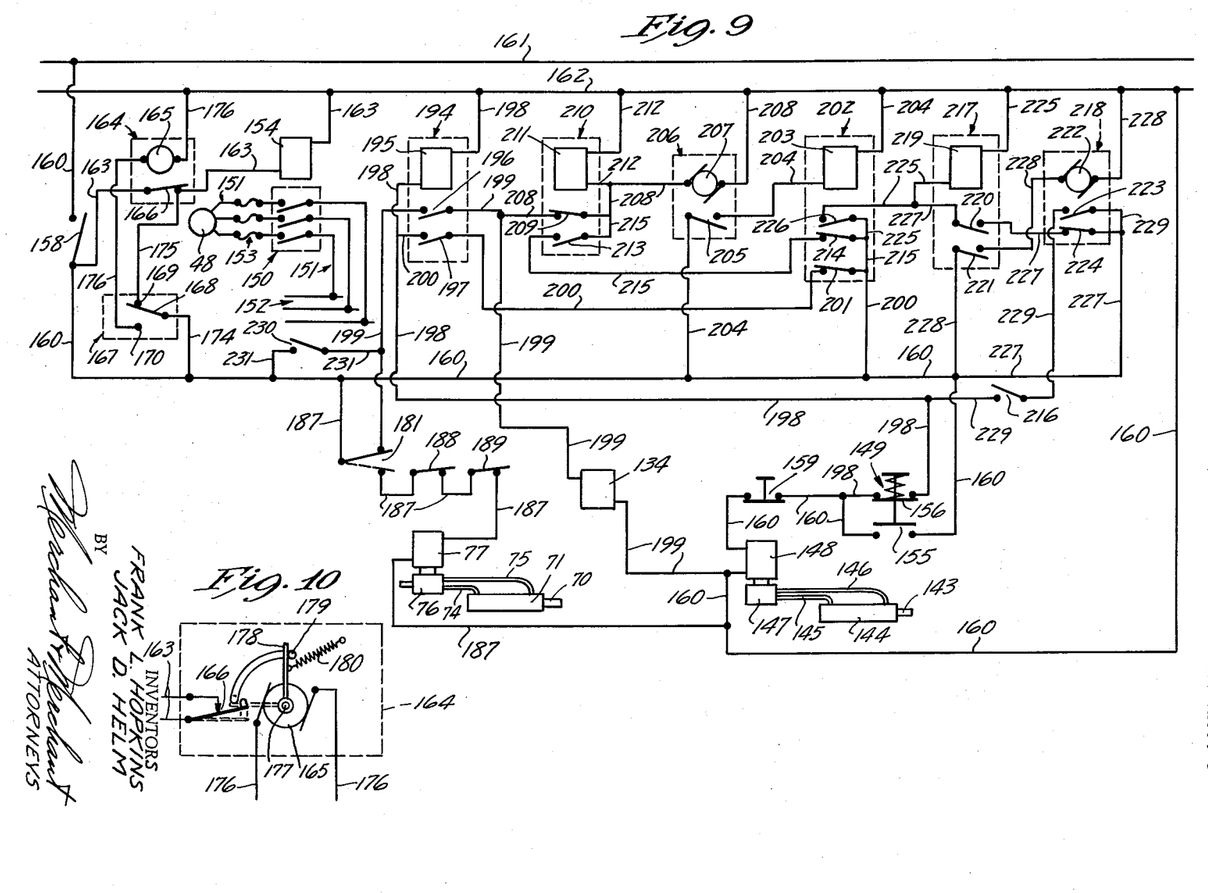
FIG. 9 is a wiring diagram.
FIG. 10 is a diagrammatic showing in greater detail of one of the control elements of FIG. 8.

The accumulator hopper 22 is provided with an open bottom 65 that is normally closed by a hopper discharge gate 66 having upstanding flanges 67 at its opposite ends that are pivotally secured to opposite side walls of the accumulator hopper 22 as indicated at 68. One of the flanges 67 is provided with an upstanding arm 69 the upper end of which is pivotally connected to the outer end of a plunger rod that is axially slidably mounted in a fluid pressure cylinder 71 pivotally secured at its inner end to a mounting bracket 72, bolted or otherwise rigidly secured to the cross member 10, see particularly FIG. 2. Preferably, the plunger rod 70 between its outer end and the adjacent end of the cylinder 71 is covered by a flexible tubular bellows 73 to protect the same against dust and the like, and to prevent such dust or foreign matter from entering the packing gland, not shown but with which the cylinder 71 may be assumed to be provided. Fluid is introduced selectively to opposite ends of the cylinder 71, to cause opening and closing of the gate 66, from a suitable source of fluid under pressure through conduits 74 and 75, control thereof being had by a conventional valve 76 operated by an electrically controlled solenoid 77 shown diagrammatically in FIG. 9.

The weighing scale 23 is preferably of the type utilizing an elongated beam or lever 78 fulcrumed intermediate its ends to a mounting bracket 79 that is mounted on the cross member 10 of the frame 1. The beam 78 is provided with a knife-edge equipped fulcrum member 80 having operative engagement with an upwardly notched supporting member 81 that is carried by the bracket 79. Although not shown, the bracket 79 may be assumed to be bifurcated, there being a pair of notches including elements 81 one on either side of the bracket 79, and each supporting a different one of a pair of the knife-edge equipped fulcrum members 80 on the beam 78. The scale beam is further provided with a longitudinally adjustable balance weight 82 that may be releasably locked in adjusted positions on the beam 78 by a conventional locking screw 83. For relatively fine adjustment, a secondary balance weight 84 is mounted on a threaded adjustment rod 85 carried by the primary balance weight 82. The extreme forward end of the scale beam 78 is provided with a pair of aligned knife-edges equipped with supporting elements 86, one of which is shown, which engages cooperating downwardly notched hanger elements 87, one of which is shown, that are operatively connected to the upper end of the weighing bucket 24 by generally rectangular bracket elements 88, one of which is shown. As is usual, in the above described type of mechanism, the axis of swinging movement defined by the elements 86 and 87 is parallel to the horizontal axis defined by the fulcrum element 80 and supporting element 87.

Figure 7:
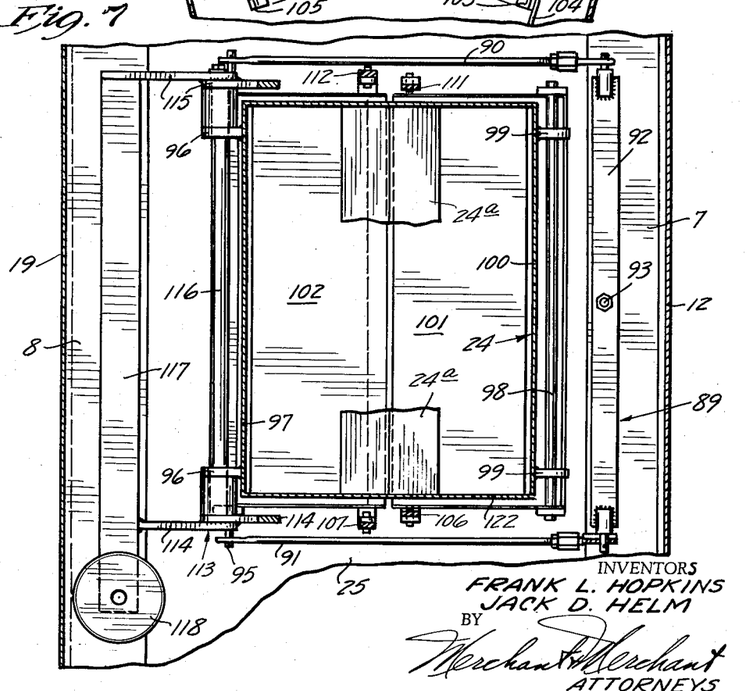
FIG. 7 is a fragmentary view partly in plan and partly in section taken substantially on the irregular line 7—7 of FIG. 3.

With reference to FIGS. 1, 2 and 3, it will be noted that the gate-equipped discharge end 65 of the accumulator hopper 22 is disposed substantially centrally of the open upper end of the weighing bucket 24, the pivotal mounting 86—87 of the bucket 24 being laterally off-set from the vertical axis of the bucket 24. With this arrangement, opening of the gate 66 permits material contained in the accumulator hopper 22 to flow by gravity to the central portion of the weighing bucket 24. Thus, the weighing bucket 24 can be used to its full carrying capacity, such not being permissible in an arrangement wherein the material is delivered to a weighing bucket closely adjacent one side thereof. The laterally off-set pivotal mounting causes the weighing bucket 24 to swing toward the rear of the frame structure 1 and tilt the axis thereof away from the vertical. To prevent such tilting while permitting the weighing bucket 24 to partake of limited vertical movement as material to be weighed is delivered thereto and released therefrom, we provide holding means therefor in the nature of a yoke structure indicated in its entirety by the numeral 89. The yoke structure 89 is horizontally disposed and of generally U-shape, comprising a pair of generally parallel links 90 and 91 each laterally outwardly spaced from an adjacent side of the weighing bucket 24, and pivotally secured at their front ends each to an opposite end of an intermediate member 92 on aligned horizontal axes parallel to the axis of swinging movement of the scale beam 78. As shown in FIG. 7, the pivotal connections between the front ends of the links 90 and 91 and the adjacent ends of the intermediate member 92 are relatively loose whereby to permit limited lateral swinging movements of the links 90 and 91 with respect to the intermediate member 92, the member 92 being mounted on the cross frame member 7 for pivotal swinging movements on a vertical axis by means of a mounting stem or the like 93. At their rear ends, the links 90 and 91 which straddle the lower discharge end portion 94 of the weighing bucket 24, are loosely pivotally connected to an elongated hinge pin 95 that is carried by spaced bearings 96 welded or otherwise rigidly secured to the rear wall 97 of the bucket 24 adjacent the lower discharge end thereof. A similar shaft 98 is journalled in bearings 99 welded or otherwise secured to the front wall of the bucket 24 adjacent the lower end thereof, the shafts 95 and 98 being parallel to the axis of swinging movement of the scale beam 78. Inasmuch as the lower end portion of the bucket 24 tends to swing rearwardly with respect to the frame structure 1 the links 90 and 91 are under tension, and the loose pivotal connections with the intermediate member 92 and the shaft 95, together with the pivotal connection 93 between the central portion of the intermediate member 92 and the cross frame member 7 permits limited lateral swinging movement of the lower end of the bucket 24 while maintaining the axis of the bucket substantially vertically disposed. Obviously, the above-described arrangement is sufficient to hold the weighing bucket 24 properly positioned without interfering with the proper function of the weighing mechanism 23, and permits material to be delivered to the center of the weighing bucket 24 for complete filling thereof when necessary, and for accurately weighing the contents.

Figure 6:
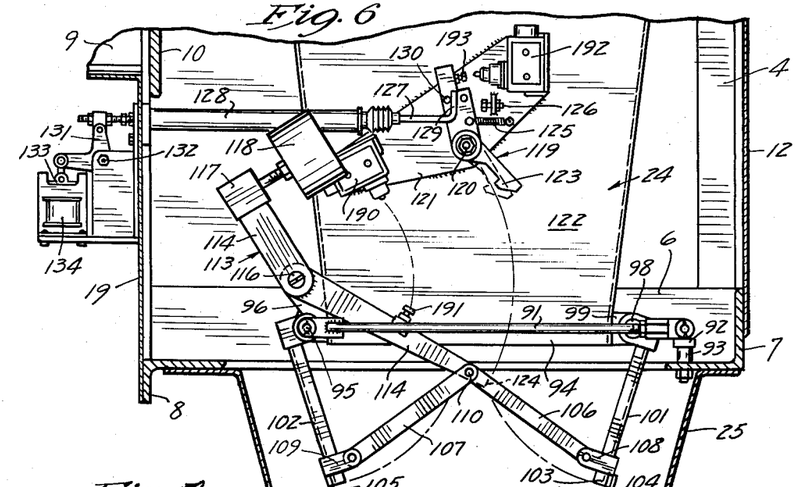
FIG. 6 is a fragmentary view corresponding to a portion of FIG. 3 but showing a different position of some of the parts.

The lower open discharge end 94 of the bucket 24 is normally closed by gate means comprising a pair of cooperating gate elements 101 and 102, the former of which is secured to the shaft 98 and the latter of which is secured to the shaft 95, for pivotal swinging movements between horizontally disposed closed positions underlying the lower end of the bucket 24, as shown in FIG. 3, and downwardly projected open positions as shown in FIG. 6. The inner longitudinal edge 103 of the gate element 101 is provided with a longitudinally extending laterally outwardly projecting lip 104 which underlies the adjacent longitudinal edge 105 of the cooperating gate element 102 when said gate elements are in their closed positions of FIG. 3, to prevent leakage of material from the bucket 24. A pair of cooperating toggle links 106 and 107 are pivotally secured to brackets 108 and 109 on respective gate elements 101 and 102, and are pivotally secured together at 110 on axes parallel to the axes of swinging movements of the gate elements 101 and 102. The opposite ends of the gate elements 101 and 102 are provided with cooperating toggle links identical to the links 106 and 107 and identified at 111 and 112, see FIG. 7.

The bucket dump gate elements 101 and 102 are yieldingly biased toward their gate closed positions of FIG. 3 by means including a generally U-shaped lever 113 which comprises a pair of lever arms 114 and 115 mounted intermediate their ends on a shaft 116 that is journalled in the bearing elements 96 in upwardly spaced parallel relation to the shaft 95. The outer ends of the lever arms 114 and 115 are welded or otherwise rigidly secured to a cross bar 117 on which is mounted a counterweight 118. The inner end of the lever arm 114 is pivotally secured to the inner ends of the toggle links 106 and 107 by means of the pivotal connection 110, and the inner end of the lever arm 115 may be assumed to be pivotally connected to the pivoted inner ends of the cooperating toggle links 111 and 112 in the same manner. It will be noted that the pairs of toggle links connecting the gate elements 101 and 102 insure substantially equal opening and closing movements of the dump gate elements 101 and 102 so that material may be discharged from the weighing bucket 24 rapidly and evenly to the bag A. Moreover, the double gate arrangement permits a bag or container A to be supported in close proximity to the bottom of the weighing bucket 24 thus lessening the impact of the material on the bottom of the bag A when discharged thereinto; and a larger discharge opening in the bottom of the bucket is permitted than when but a single discharge gate is emphasized in the space provided.

The combined weight of the relatively heavy cross bar 117 and counterweight 118 is sufficient to cause the dump gate elements 101 and 102 to be moved to their closed positions of FIG. 3 when the bucket 24 is empty, but insufficient to hold the dump gate elements 101 and 102 in their closed position against the weight of a predetermined quantity of granular material delivered to the weighing bucket 24. It will be further noted that the counterweight 118 is so disposed that the same is moved to a position in overlying relation to the axis of the pivot shaft 116 when the dump gate elements 101 and 102 are moved to their open position of FIG. 6. With this arrangement, the dump gate elements 101 and 102, when moved to their open positions of FIG. 6 by weight of the material in the weighing bucket 24, will pause in their open positions for a length of time sufficient for all of the material to be discharged from the weighing bucket 24. In other words, when the top gate elements 101 and 102 are released for opening movements, the same will open rapidly to their position of FIG. 6 and pause momentarily before automatically closing as the counterweight 118 moves circumferentially away from said position overlying the axis of the shaft 116. Means to hold the dump gate elements 101 and 102 in their closed positions of FIG. 3 against weight of material in the weighing bucket 24 comprises a latch element 119 that is pivotally mounted intermediate its ends, as indicated at 120, to a mounting plate 121 welded or otherwise secured to a side wall 122 of the weighing bucket 24. The latch element 119, at its lower end, is formed to provide a latch hook portion 123 that engages an extended inner end portion 124 of the lever arm 114, see particularly FIG. 3. The latch element 119 is yieldingly urged toward engagement of the hook portion 123 with the lever end portion 124 by a coil tension spring 125 having one end secured to the latch element 119 and its other end secured to the mounting plate 121. An adjustable stop screw 126 is mounted on the mounting plate 121 and engages an adjacent side edge portion of the latch element 119 to limit spring-imparted movement thereof toward engagement with the end portion 124 of the lever arm 114.

Means for moving the latch element 119 in a direction to release the dump gate elements 101 and 102, and against bias of the spring 125 when a predetermined quantity of material is present in the weighing bucket 24, comprises a horizontally disposed elongated trip arm or rod 127 which is mounted in a stationary tubular supporting member 128 for axial movements with respect thereto and which is provided at one end with an upturned end 129 that extends between a pair of pins or studs 130 that project laterally outwardly from the latch element 119. At its opposite end, axially outwardly of the tubular supporting member 128, the rod 127 is pivotally connected to one end of a bell crank 131 that is pivotally secured with respect to the frame structure as indicated at 132, see FIGS. 3 and 6. The other end of the bell crank 131 is operatively connected to the armature 133 of a solenoid indicated generally at 134. A coil compression spring 135 is interposed between the inner end 136 of the tubular supporting member 128 and a collar 137 on the trip arm 127, to yieldingly urge the trip arm 127 in a direction to cause latching engagement between the latch hook portion 123 and the adjacent inner end portion 124 of the lever arm 114. When the solenoid 134 is energized, as will hereinafter appear, the trip arm of rod 127 is moved thereby in a direction to impart releasing movement to the latch element 119 against bias of the springs 125 and 135.

For cushioning the impact of material dumped into the bucket 24 from the accumulator hopper 22 to prevent premature movement of the scale beam 78, and for aiding in the even distribution of the material as it falls into the scale bucket 22, we provide an inverted V-shaped baffle element 24-a which extends transversely within the bucket 22 from the sidewall 122 to the opposite sidewall 122a adjacent the upper ends thereof. It will be noted that the baffle element 24-a is disposed centrally between the rear and front walls 97 and 100 respectively of the bucket 22, so as to directly underlie the discharge opening 65 of the accumulator hopper 22.

Figure 8:
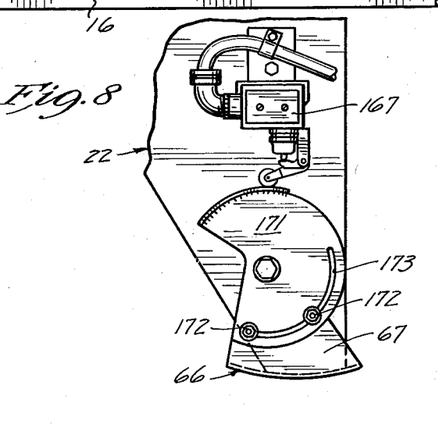
FIG. 8 is a fragmentary view in elevation of the side of the accumulator hopper of our invention opposite the side shown in FIG. 2.

The bag holding mechanism 26 is fully disclosed in the pending application, Serial No. 580,055, filed April 23, 1956, now Patent No. 2,890,006, in the United States Patent Office by Frank L. Hopkins, reference being had thereto. Briefly state, this mechanism comprises a pair of gripping arms 138 and 139 pivotally mounted to the delivery chute 25 as indicated at 140 and 141 respectively and connected by a tie rod 142. The upper end of the gripping arm 138 is pivotally connected to the outer end of a piston plunger 143, and the upper end of the gripping arm 139 is pivotally connected at its upper end to a cooperating fluid pressure cylinder 144 in which the piston plunger 143 is mounted for relative extending and retracting movements. The gripping arms 138 and 139 are movable between the operative bag gripping positions shown in FIG. 1 and operative bag release positions angularly disposed with respect to said bag gripping positions. Fluid under pressure is supplied alternately to opposite ends of he cylinder 144 from a suitable source of fluid not shown, through conduits 145 and 146, and controlled by a conventional valve 147 actuated by a solenoid 148, said valve and solenoid being diagrammatically shown in FIG. 8.

The machine of the instant invention is adapted for use selectively in a semi-automatic manner or fully automatic, as desired. When operated semi-automatically, closing of a master switch causes the feeding motor 48 to be energized to impart feeding movement to the feeding belt 46 whereby the granular or powdered material B is fed to the accumulator hopper 22 at a rate of speed governed by the position of the barrier element 56 and for a predetermined time interval after which the motor 48 is automatically deenergized. The amount of granular material fed to the accumulator hopper 22 during this time interval is slightly less than that desired to be dispensed into the container or bag A. At any desired time, during filling of the accumulator hopper, or thereafter, the operator applies an open bag to the bag receiving lower end portion 27 of the delivery chute 25 and operates a switching device 149 to cause the bag supporting mechanism 26 to become operative to grip and hold the bag A in position. Operation of the switching device 149 further causes the hopper discharge gate 66 to be opened to permit material contained in the accumulator hopper 22 to be discharged into the weighing bucket 24 at a very rapid rate. In the event that the feeding motor 48 has become deenergized, the same becomes reenergized to cause feeding of the material at a relatively low rate to the weighing bucket 24 through the opened discharge portion 65 of the accumulator hopper 22. If, on the other hand, the switching device 149 is operated before the accumulator hopper 22 had been filled to the given predetermined extent, the gate 66 opens and the motor 48 will simply continue to operate to feed material to the bucket 24 through the open gate 66 of the accumulator hopper 22. In either case, feeding of the material to the weighing bucket 24 will occur until the material in the weighing bucket 24 reaches a predetermined weight at which time movement of the scale beam 78 will cause operation of a control switch for the hopper gate closing mechanism whereby the gate 66 will be closed. The switching device 149 further causes energization of the solenoid 134 to impart movement to the latch element 119 in a direction to release the dump gate elements 101 and 102, whereby the weight of material in the weighing bucket 24 causes said dump gate elements to open, allowing the material to be dumped into the bag A, after which the bag holding arms 138 and 139 are operated to release the filled bag A for transportation to suitable means, not shown, for closing the bag for transport or storage. A succeeding bag A may then be applied to the discharge end portion 27 of the delivery chute 25, the operation repeated. It will be noted that, during the dumping of the scale bucket 24, removal of the filled bag A and placement of a succeeding empty bag on the delivery chute, the motor 48 is operating to cause material to be fed to the accumulator hopper 22.

With the above described arrangement, it is necessary that the operator manipulates the switch 149 for each cycle of operation. To render the machine completely automatic, we provide additional control mechanism including timing devices which operate to cause discharge of material from the accumulator hopper 22 to the weighing bucket 24 without prior deenergization of the feeding motor 48, so that said feeding motor operates continuously. As in the above arrangement, when the weighing bucket 24 has received a predetermined quantity by weight of material from the accumulator hopper 22, the hopper discharge gate 66 is closed and the material is discharged or dumped from the weighing bucket 24 into the bag A. Operation of the bag holding mechanism 26 is controlled by one or more of the timing devices, and the operator of the machine is depended upon to apply a succeeding bag to the bag supporting mechanism during the time interval in which the bag supporting arms 138 and 139 are in their inoperative positions. It will be appreciated that the bags A may be manually applied to the machine for filling or, if desired, suitable automatic mechanism, not shown, may be provided for this purpose.

As above indicated, control mechanism for the instant machine involves a control system including several control elements now to be described. The feeding motor 48 is preferably of the three-phase variety and is energized by closing of a multi-pole switch 150 interposed in a multiple lead 151 which receives current from a three-phase power line indicated generally at 152. The motor 48 is protected by the usual fuses 153 interposed in the leads 151, and the multi-pole switch 150 is closed through energization of a motor control relay coil 154. The manually operated switching device 149 comprises a pair of switches 155 and 156, the former of which is normally open, and the latter of which is normally closed, said switches being operated by a foot pedal 157 which, when depressed partially, causes closing of the switch 155 while the switch 156 is closed, further depressing of the pedal 157 causing the switch 156 to be opened. The switch 155 is interposed in series with the solenoid 148, a master switch 158 and a normally closed emergency push button 159, in a lead 160 that is connected at its opposite ends to opposite power conductors 161 and 162 which may be assumed to be connected to a source of electric potential, not shown. The motor control relay 154 is interposed in a circuit comprising a portion of the lead 160, the switch 158 and a lead 163. The motor control relay 154 is controlled by a timing device 164 comprising a timing motor 165, a normally closed switch 166 that is interposed in the lead 163 in series with the relay coil 154, and a double throw switch 167 comprising a movable contact element 168 operable between positions in which it alternately engages spaced fixed contacts 169 and 670. The switch 167 is suitably mounted on the accumulator hopper 22 and positioned to be operated by a cam 171 adjustably mounted on one of the flanges 67 of the accumulator hopper gate 66, see FIG. 8, by means of nut equipped screws 172 extending from the adjacent flange 67 through an elongated slot 173 in the cam 171. The contact element 168 is connected to the lead 160 by a lead 174, the fixed contact 169 being connected to the lead 163 between the switch 166 and the relay coil 154 by a lead 175, and the contact 170 forming one end of a lead 176 the other end of which is connected to the conductor 162, the timing motor 165 being interposed in the lead 176. The timing device 164 is shown diagrammatically in greater detail in FIG. 10, the motor 165 having an output shaft 177 on which is mounted a switch engaging arm 178 that is yieldingly biased toward an adjustable stop pin 179 by means of a spring 180. The arm 178 is frictionally mounted on the shaft 177 and is moved thereby in a counterclockwise direction with respect to FIG 10 toward engagement with the switch 166 to open the same. After the switch 166 is opened, continued operation of the motor 165 will cause the shaft 177 thereof to slip with respect to the arm 178. When the motor 165 is deenergized, the spring 180 will return the switch operating arm 178 to its full line position of FIG. 10. The shaft 177 of the motor 165 is rotated at a predetermined speed to provide a selected given time interval between energization of the motor 165 and opening of the switch 166, the duration of this time interval being determined by the position of the stop pin 179, which, when desired, and as will hereinafter appear, may be set to hold the switch 166 open indefinitely.

A double throw switch 181 is shown in FIG. 3 as being enclosed in a housing 182 mounted on the frame structure 1 adjacent the free end of the scale beam 78, and is operated by a lever 183 which is adapted to be engaged by the end of a pin or bolt 184 rigidly secured to the free end portion of the scale beam 78. Upward movement of the scale bucket 24 pursuant to discharge of weighed material therefrom causes the lower end of the pin 184 to engage the operating lever 183 to position the switch 181 as indicated by dotted lines in FIG. 9. Further, the upward movement of the bucket, and consequent movement of the switch operating arm 183 causes a latch member 185 to engage the arm 183 to hold the switch 181 in its dotted line position of FIG. 9. Downward movement of the scale or weighing bucket 24 caused by filling the same with material from the accumulator hopper 22, imparts upward movement to the beam end portion carrying the pin or bolt 184 toward engagement of the upper end of the pin or bolt 184 with the latch member 185 to move the same upwardly to release the operating arm 183 whereby the switch 181 assumes its full line position of FIG. 9 to deenergize the solenoid 77. The accumulator gate operating solenoid 77 is contained in a circuit which includes a portion of lead 160, switch 158, the scale beam operated switch 181, and a lead 187 in which is interposed in series a pair of two-positioned switches 188 and 189, the former of which is contained in a casing 190 on the mounting plate 121 and positioned to be engaged by an operating head 191 on the lever arm 114, when the weighing bucket dump gate elements 101 and 102 are moved to their closed positions in FIG. 3. With the gate elements in their closed positions, the switch 188 is in its closed position of FIG. 9. The switch 189 is contained in a casing 192 mounted on the mounting plate 121, and is adapted to be engaged by an operating head 193 on the upper end portion of the latch element 119 when the gate elements 101 and 102 are closed. In the closed position of the gate elements 101 and 102, the switch 189, like the switch 188, is closed. With the switch in its dotted line position of FIG. 9 and the switches 188 and 189 closed, the hopper discharge gate solenoid 77 is energized to cause discharge of material from the accumulator hopper 22 to the weighing bucket 24. Control of the bucket gate latch operating solenoid 134 is had through a relay 194 comprising a coil 195 and a pair of normally open switches 196 and 197, the switch 156 of the switching device 149 and the switch 181. The relay coil 195 is interposed in a lead 198 in series with the switch 156, said lead 198 extending from the power conductor 162 to the lead 160 between the switches 155 and 159. Thus, closing of the switch 155, while maintaining switch 156 closed, causes energization of the relay coil 195 to close the switch 196 to energize the solenoid 134 to cause dumping of material from the weighing bucket 24 to the bag A when the switch 181 is in its full line position of FIG. 9, the same being caused to assume its full line position by filling of the bucket 24 with the predetermined amount or bulk charge of material A. The switch 196 is serially connected with the solenoid 134 in a circuit including a portion of lead 160, switch 158, the lead 187, and a lead 199 extending from the switch 181 to the lead 160 between its connection to the bag clamping solenoid 148 and the power conductor 162. It will be noted that, when the bucket 24 becomes filled with the predetermined weight of material, the movable element of the switch 181 moves from its dotted line position to its full line position of FIG. 9 whereby to deenergize the accumulator gate solenoid 77 to cause the closing of the hopper discharge gate 66 and simultaneous energization of the solenoid 134 to unlatch the dump gate elements 101 and 102. The switch 197 is a holding switch for the relay coil 195 and is interposed in a lead 200 in series with a normally closed switch 201, said lead 200 being connected at one end to the lead 160 and at its other end to the lead 198 between the relay coil 195 and the switch 156. It will be noted that, the switches 188 and 189 being connected in series in the circuit of the hopper discharge gate solenoid 77, said solenoid cannot be energized unless both switches 188 and 189 are closed and such closing of the switches cannot be obtained unless the weighing bucket gates 101 and 102 are latched closed and the solenoid 134 deenergized. It is only under these conditions that the empty weighing bucket 24 is in readiness to receive material.

The switch 197 not only serves as a holding switch for the relay coil 195 but further serves to hold the bag clamp solenoid 148 energized until all of the material B has been dumped from the weighing bucket 24 to the bag A. The duration of energization of the relay coil 195 is controlled by a relay 202 comprising the normally closed switch 201 and a relay coil 203, said coil 203 being interposed in a lead 204 extending from the lead 160 to the power-conductor 162. Also interposed in the lead 204 in series with the coil 203 is a normally open switch 205 of a timer 206 similar to the timer 164 and including a timer motor 207. The timer 206 differs from the timer 164 only in that the switch 205 thereof is closed after a predetermined time interval to cause energization of the coil 203 of the relay 202. The timer motor 207 is contained in a circuit comprising a lead 208 extending from the lead 199 between the switch 196 and solenoid 134, to the power conductor 162. Interposed in the lead 208 is a normally closed relay switch 209 of a relay 210 having a relay coil 211. The coil 211 forms part of a circuit including a lead 212 connected at one end to the lead 208 between the switch 209 and the timer motor 207, and at its other end to the power conductor 162. Obviously, as soon as the relay coil 211 becomes energized, the switch 209 thereof opens. However, the relay coil 211 is held energized by a circuit including a normally open switch 213 that is closed by energization of the relay coil 211 and a switch 214 of the relay 202 connected in series in a lead 215 which is connected at one end to the lead 200 and at its other end to the lead 208 between the switch 209 and the timer motor 207. The switches 213 and 214, hold the timer motor 207 and relay coil 211 energized; and the switches 197 and 201 hold the relay coil 195 and bag clamp solenoid 148 energized; both until the timer motor 207 closes the switch 205 to energize the coil 203 of the relay 202 to cause opening of the switches 201 and 214. When this occurs, the relay coil 195 becomes deenergized to cause release of the filled bag, the coil 211 of the relay 210 becomes deenergized to break the circuit to the motor 207 of the timer 206, and the relay coil 203 becomes deenergized to ready the circuit for a new cycle of operation. In the meantime, the accumulator hopper 22 is being filled with a predetermined quantity of material B less than the quantity thereof to be dispensed. The next succeeding cycle of operation is initiated by the operator when an empty bag A has been placed in position and the operator closes the switch 155. It will be noted that, during both fast and slow feeding of material from the accumulator hopper 22 to the weighing bucket 24, while the accumulator discharge gate 66 is open, the relay coil 154 which controls operation of the feeding motor 48 is energized through parallel circuits including respectively the switch 166 and the closed contacts 168 and 169 of the switch 167. As soon as the bulk charge of material in the weighing bucket 24 is brought to the desired weight, the scale beam operated switch 181 will move from its dotted line position of FIG. 9 to its full line position thereof to deenergize the solenoid 77 to cause closing of the gate 66 and consequent opening of the contacts 168 and 169 and closing of the contacts 168 and 170 of the switch 167 to energize the timer motor 165. The feeding motor 48 will continue to operate until the timer motor 165 causes the timing switch 166 to be opened, at which point the feeding operation to the accumulator hopper will cease unless the operator manipulates the switching device 149 to cause closing of the switch 155.

The above described control system requires that the switching device 149 be manipulated by the operator to close the switch 155 for each operating cycle of the machine. For the purpose of rendering the machine entirely automatic, we provide additional control mechanism including a selector switch 216, a control relay 217 and an additional timer 218. The control relay 217 comprises a relay coil 219 and a pair of normally open switches 220 and 221, the timer 218 being similar to the timers 164 and 206, the same comprising a motor 222, a normally open switch 223 and a normally closed switch 224. The relay coil 219 is contained in a circuit including a lead 225 in which is interposed a normally open switch 226 that is closed by energization of the relay coil 203. The lead 225 is shown as being connected at one end to the lead 215 between the switch 214 and lead 200 and at its other end to the power conductor 162. The switches 220 and 224 are interposed in series in a lead 227 that is connected at one end to the lead 160 between the switches 158 and 155, and at its other end to the lead 225 between the switch 226 and relay coil 219 to provide a holding circuit for the relay coil 219. The timer motor 222 and switch 221 are interposed in a lead 228 connected at one end to the lead 160 between the switch 155 and 158, and at its other end to the power conductor 162 to provide a circuit for the timer motor 222.

When the switch 216 is open, operation of the machine is semi-automatic, as above described. However, when the switch 216 is closed, said switch 216 and switch 223 together with a connecting lead 229 provide a shunt for the switch 155, the lead 229 being connected at one end to the lead 198 and at its other end to the lead 227 between its connection to the lead 160 and the switch 224. Thus, the timing device 218 replaces the operator's manipulation of the switching device 149 to initiate successive cycles of operation. With the switches 158 and 216 closed, the first cycle of operation is initiated by manual closing of the switch 155. During the initial cycle of operation, when the coil 203 of the relay 202 is energized, the switch 226 is closed to energize the coil 219 of the relay 217 which coil is held energized through the closed switches 220 and 224 after deenergization of the relay coil 203 and consequent deenergization of the relay coil 195 to open the bag clamp solenoid 148. Energization of the relay coil 219 closes the switch 221 to energize the timer motor 222 which, after a predetermined time interval, opens the switch 224 to deenergize the relay coil 219, and closes the switch 223 to energize the bag clamp solenoid 148 and the relay coil 195 to initiate a succeeding cycle of operation. Obviously, during this said time interval, an empty bag must be applied to the delivery chute end 27 either automatically or by the operator prior to reenergization of the solenoid 148.

In the event that a bag A is not properly placed on the delivery chute end 27, the operator may, by opening the switch 159, deenergize the solenoid 148 for a sufficient length of time to enable him to properly place the bag on the delivery chute end 27. Further, for the purpose of emptying the machine of granular material at the end of a run, we provide a switch 230 that is interposed in a lead 231 connected at one end to the lead 160 and at its other end to the lead 199 between the switches 181 and 196. The switch 230 and lead 231 shunt the switch 181 as the operator causes energization of the relay coil 195 by manually closing the switch 149 which in turn causes energization of the solenoid 134 to permit dumping of whatever material remains in the weighing bucket 24 when said material is of insufficient weight to cause positioning of the switch 181 as indicated by full lines in FIG. 9. This feature of our invention is important particularly when material having corrosive qualities, such as chemical fertilizer and the like is being dispensed by the instant machine.

The switching device 149 permits the instant machine to be utilized to dispense multiples of a given quantity to a single container while the container is held on the discharge end portion 27 of the discharge chute 25 by the gripping arms 138 and 139 during two or more operating cycles of the machine. This can be accomplished either during semi-automatic or automatic functioning of the machine. The operator merely causes a bag A to be attached to the discharge chute 25 in the usual manner and presses the lever 157 to the extent that the switch 155 closes and the switch 156 opens. Inasmuch as the switch 156 does not open until after the switch 155 has closed, the operating cycle of the machine is initiated through energization of the relay coil, 195 the coil being held energized by the closed holding switch 197 and the closed switch 201 of the relay 203. Upon completion of the first of a selected number of operational cycles, the relay coil 195 will be deenergized when the switch 201 is opened due to energization of the relay coil 203, but the bag clamping solenoid 148 will remain energized through the held closed switch 155. If the switch 216 is closed, operation of the timing device 218 will cause a second cycle of operation to be initiated in the usual manner. However, if the switch 216 is open, it is only necessary that the operator permits the switch pedal 157 to be raised sufficiently to close the switch 156 while maintaining the switch 155 closed to initiate the second cycle of operation. If it is desired that but two weighed quantities of material are to be discharged to a single container, the operator releases the pedal 157 of the switching device 149, and the container or bag A will be automatically released after the second charge of material has been delivered thereto. Obviously, as many such charges of material as desired may be dispensed to a single container, it being merely necessary that the operator permit opening of the switch 155 and closing of the switch 156 during the last desired operational cycle of the machine.

Due to the fact that the feeding motor 48 and feed belt 46 coast to a stop when the motor 48 is deenergized, a given quantity of the material B continues to be fed to the accumulator hopper 22 after deenergization of the motor control relay 154. When the machine is utilized to dispense relatively small quantities of the material, this accumulation of the material B in the accumulator hopper 22 so closely approximates the total weight of the bulk charge to be dispensed, that an over supply of material is fed to the weighing bucket before the hopper discharge gate 66 can be reclosed. To overcome this difficulty when dispensing such relatively small quantities of material, we shift the stop pin 179 of the timer 164 to its dotted line position of FIG. 10 to cause the switch 166 to be held open. This done, operation of the feeding motor 48 is controlled entirely by operation of the switch 167 responsive to opening and closing of the accumulator hopper discharge gate 66; thus, the material B is fed to the accumulator hopper 22 when the gate 66 is open, and stopped when the gate 66 is closed, except for the small quantity which is delivered to the accumulator hopper 22 while the feeding belt 46 is coasting to a stop.

It will be appreciated that the top, front, rear, side, and the bottom walls, together with the discharge chute 25, of the above machine cooperates to totally enclose the weighing and dispensing mechanism, thus confining the dust from powdered or granular material to the inside of the machine. With this arrangement, the operator is protected from injury which might result from breathing corrosive dust when the machine is used to dispense commercial fertilizers and the like. Furthermore, the danger of explosion or fire due to heavy dust concentration exterior of the machine, is substantially eliminated.

Our invention has been thoroughly tested and found to be completely satisfactory for the accomplishment of the objects set forth; and, while we have shown and described a preferred embodiment of our weighing and dispensing machine, it will be understood that the same is capable of modification without departure from the spirit and scope of the invention as defined in the claims.

What we claim is:

1. In a machine for dispensing predetermined quantities of bulk material, a frame structure, weighing scale mechanism including a scale beam, fulcrum means on said frame structure mounting said scale beam for limited swinging movements on a horizontal axis, an open-topped vertically disposed weighing bucket having a discharge opening in its bottom portion and gate means normally closing said discharge openings, means for delivering bulk material to said bucket and including a delivery mouth overlying the central portion of the upper end of said bucket, means for securing said bucket to said beam for swinging movements relative to said beam about an axis parallel to the axis of swinging movement of the beam on said fulcrum means, said axis of relative swinging movement being laterally off-set form the vertical axis of said bucket, mechanism for maintaining said axis of the bucket substantially vertical in all positions of swinging movement of said scale beam, said last mentioned mechanism comprising a horizontally disposed generally U-shaped yoke structure including an intermediate member pivotally mounted at its central portion to the frame structure on a vertical axis and a pair of laterally spaced parallel links each pivotally connected at one of its ends to a different end of said intermediate member and at its other end to an adjacent side of said bucket, the pivotal connections of said links to said bucket being on a common axis parallel to the axis of swinging movement of said scale beam, and mechanism for opening and closing said gate means.

2. The structure defined in claim 1 in which said means for securing said bucket to the scale beam comprises a bracket secured to the upper end of the bucket and projecting upwardly therefrom, whereby the bucket is suspended below the scale beam, the links of said yoke structure being connected to the lower end portion of said bucket.

3. In a machine for dispensing predetermined quantities of bulk material, a frame structure, a weighing scale supported by said frame structure and including a weighing bucket having a discharge passage in its bottom and a dump gate normally closing said discharge passage, latch mechanism releasably locking said gate in its closed position, said gate being urged toward an open position by weight of material in said bucket, means for closing said gate when the bucket is empty, an accumulator hopper positioned to discharge bulk material into said bucket, said accumulator hopper having a discharge opening in its bottom and a gate normally closing said discharge opening, power-operated mechanism for said hopper discharge gate, power-operated feeding mechanism delivering material to said accumulator hopper at a uniform predetermined relatively low rate, control mechanism connected to said hopper gate operating mechanism and operative periodically to open said hopper gate to rapidly dump the accumulated contents of the hopper into the bucket and subsequently allow direct delivery of material at a lower rate to said bucket through the open hopper, and control mechanism comprising a weighing scale-actuated control element and responsive to a predetermined weight of material in the bucket to render said hopper discharge gate operating mechanism operative to close said hopper discharge gate and to release the latch mechanism to allow opening of the bucket dump gate for discharge of the weighed predetermined quantity of material from the weighing bucket.

4. In a machine for dispensing predetermined quantities of bulk material, a frame structure, a weighing scale supported by said frame structure and including a weighing bucket having a discharge passage in its bottom and a dump gate normally closing said discharge passage, latch mechanism releasably locking said gate in its closed position, said gate being urged toward an open position by weight of material in said bucket, means for closing said gate when the bucket is empty, an accumulator hopper positioned to discharge bulk material into said bucket, said accumulator hopper having a discharge opening in its bottom and a gate normally closing said discharge opening, power-operated mechanism for said hopper discharge gate, power-operated feeding mechanism delivering material to said accumulator hopper at a uniform predetermined relatively low rate, control means for said feeding mechanism operative periodically to stop the feeding of material to said accumulator hopper at a time when less than the predetermined quantity is present in the hopper, control mechanism responsive to closing of the bucket dump gate to render said hopper gate operating mechanism operative to open said hopper discharge gate to rapidly dump the accumulated contents of the hopper into the bucket and to render the feeding means operative to deliver the material at a lower rate to said bucket, through the open hopper, and control mechanism comprising a weighing scale actuated control element and responsive to a predetermined weight of material in the bucket greater than that accumulated in the hopper to render said discharge gate operating mechanism operative to close said hopper discharge gate and to release said latch mechanism to allow opening of the bucket dump gate for discharge of the weighed predetermined quantity of material from the weighing bucket.

5. The structure defined in claim 4 in which said weighing bucket dump gate is pivotally secured to the weighing bucket for swinging movements between a horizontal closed position underlying the bottom of the bucket and a downwardly projecting open position, said means for closing the dump gate comprising a counterweight on said dump gate and exerting yielding bias against the dump gate toward said closed position sufficient to close said gate when the bucket is empty but insufficient to hold said gate closed against weight of the quantity of material to be dispensed.

6. The structure defined in claim 4 in which said feeding mechanism comprises an endless feeding belt having a generally horizontally disposed delivery flight one end portion of which receives material from a source of supply, and in further combination with means for varying the quantity of material carried by said delivery flight, said means comprising a barrier element overlying said delivery flight intermediate the ends thereof and mounted for movements of a free edge thereof toward and away from said delivery flight, whereby to vary the thickness of the layer of material carried by said delivery flight to the accumulator hopper, and means for releasably locking said barrier element in desired set position of the free edge thereof.

7. The structure defined in claim 4 in which said feeding mechanism includes an electrically operated motor, and in which the control means therefor comprises circuit means including a switch and a timing device for said switch, said timing device being responsive to closing of said hopper discharge gate when said bucket contains said predetermined weight of material to energize said motor for a predetermined time interval to deliver material to said accumulator hopper and to deenergize said motor when said predetermined quantity of material less than the total quantity to be dispensed is delivered to said accumulator hopper.

8. The structure defined in claim 4 in which said power-operated mechanism for the hopper discharge gate is operable in one direction to open said hopper discharge gate and in the other direction to close said gate, said control mechanism therefor including an electrically operated control element and circuit means including a pair of serially connected switches carried by said weighing bucket and response to movement of the bucket dump gate to its closed position and locking thereof by said latch mechanism to close a circuit through said electrically operated control element, whereby to render said power-operated mechanism operative in a direction to open said hopper discharge gate.

9. In a machine for dispensing predetermined quantities of bulk material, a frame structure, a weighing scale supported by said frame structure and including a weighing bucket having a discharge passage in its bottom and a dump gate normally closing said discharge passage, latch mechanism releasably locking said gate in its closed position, said gate being urged toward an open position by weight of material in said bucket, means for closing said gate when the bucket is empty, power-operated means for releasably holding a container positioned to receive the material dumped from said weighing bucket, an accumulator hopper positioned to discharge bulk material into said bucket, said accumulator hopper having a discharge opening in its bottom and a gate normally closing said discharge opening, power-operated mechanism for said hopper discharge gate, power-operated feeding mechanism delivering material to said accumulator hopper at a uniform predetermined relatively low rate, control mechanism connected to said hopper gate operating mechanism and being operative periodically to open said hopper gate at a time when less than the predetermined quantity is present in the hopper to rapidly dump the accumulated contents of the hopper into the bucket and subsequently allow direct delivery of material to said bucket through the open hopper, control mechanism comprising a weighing scale actuated control element and responsive to a predetermined weight of material in the bucket to render said hopper discharge gate operating mechanism operative to close said hopper discharge gate and to release the latch mechanism to allow opening of the bucket dump gate for discharge of the weighed predetermined quantity of material to said container, and control mechanism for said container holding mechanism and including a timing device operative responsive to said predetermined weight of material in the bucket to render said container holding mechanism operative to release said container after a predetermined time interval subsequent to release of said latch mechanism.

10. The structure defined in claim 9 in further combination with control means operatively coupled to the control mechanism for said container holding mechanism and including a second timing device operative responsive to release of said container to render said container holding mechanism operative to engage and support a succeeding container after a predetermined time interval subsequent to release of said first mentioned container.

11. The structure defined in claim 9 in which said control mechanism for the container-holding mechanism includes a control element selectively operative to shunt said second timing device and hold said container holding mechanism operative to support said container for a subsequent dispensing cycle, whereby a plurality of said weighed quantities of material may be dispensed to a single container prior to release of said container by said container holding mechanism.

12. In a machine for dispensing pre-determined quantities of bulk material, a frame structure, weighing scale mechanism mounted in said frame structure, an open topped vertically disposed weighing bucket having an open bottom discharge portion and gate means normally closing said bottom portion, means for delivering bulk material to the open upper end of said bucket, means for securing said bucket to said weighing scale mechanism, said gate means comprising a pair of cooperating gate elements pivotally secured to opposite sides of said bucket on parallel axes for swinging movements between generally horizontal closed positions underlying the bottom of said bucket and downwardly directed open positions angularly disposed relative to said closed positions, a toggle joint comprising a pair of cooperating toggle links pivotally connected at their adjacent inner ends, the outer end of each of said toggle links being pivotally connected to a different one of said gate elements, means comprising a lever and a counterweight on one end portion of said lever exerting yielding bias against said toggle joint in a direction to close said gate means, the bias exerted by said last-mentioned means being sufficient to close said gate means when the bucket is empty but insufficient to hold the gate means closed against weight of a given quantity of material deposited in said bucket, said lever being mounted on said bucket for pivotal movements generally in the direction of movement of one of said gate elements, the opposite end portion of said lever being pivotically connected to the inner connected ends of said toggle links, a latch element operatively engaging said toggle joint when said gate elements are moved to their closed positions to cause locking of said gate elements in their closed positions, and mechanism for operating said latch element to release said toggle joint to permit opening of said gate means when a predetermined load by weight of material is deposited in said bucket, said counterweight being disposed above the level of said gate elements when said gate elements are in their closed positions and being moved to a position in substantially overlying spaced relation to the axis of pivotal movement of said gate elements to their gate open positions, whereby to momentarily deter subsequent movement of said gate elements to their gate closed positions during discharge of material from said bucket.

References Cited in the file of this patent

UNITED STATES PATENTS

| | | |
|---|---|---|
| 1,733,410 | Johnson | Oct. 29, 1929 |
| 2,058,775 | Cundall | Oct. 27, 1936 |
| 2,097,522 | Hanique | Nov. 2, 1937 |
| 2,406,934 | Williams et al. | Sept. 3, 1946 |
| 2,443,350 | Gilbert et al. | June 15, 1948 |
| 2,455,433 | Matsen | Dec. 7, 1948 |
| 2,564,544 | Richardson | Aug. 14, 1951 |
| 2,576,411 | Mosher | Nov. 27, 1951 |
| 2,790,619 | Schachte | Apr. 30, 1957 |
| 2,805,834 | Terry | Sept. 10, 1957 |